(12) United States Patent
Bateman et al.

(10) Patent No.: US 9,598,875 B1
(45) Date of Patent: Mar. 21, 2017

(54) TELESCOPING MAST ASSEMBLY WITH SAFETY LATCH SYSTEM

(71) Applicant: MULTIQUIP, INC., Carson, CA (US)

(72) Inventors: Nathaniel Cody Bateman, Boise, ID (US); Jeffrey Kevin Davis, Boise, ID (US); Erick Del Real, Boise, ID (US)

( * ) Notice: Subject to any disclaimer, the term of this patent is extended or adjusted under 35 U.S.C. 154(b) by 0 days.

(21) Appl. No.: 15/009,627

(22) Filed: Jan. 28, 2016

(51) Int. Cl.
| | | |
|---|---|---|
| *B66C 23/06* | (2006.01) | |
| *E04H 12/18* | (2006.01) | |
| *F16B 7/10* | (2006.01) | |

(52) U.S. Cl.
CPC .......... *E04H 12/182* (2013.01); *F16B 7/105* (2013.01)

(58) Field of Classification Search
CPC ............................. E04H 12/182; F16B 7/105
USPC ........................... 52/121, 111, 113, 114, 118
See application file for complete search history.

(56) References Cited

U.S. PATENT DOCUMENTS

| | | | |
|---|---|---|---|
| 2,508,835 A | | 5/1950 | Moon et al. |
| 3,495,364 A | | 2/1970 | De Bella |
| 3,688,455 A | * | 9/1972 | Zebuhr ................. E04H 12/182 343/883 |
| 3,738,075 A | | 6/1973 | Nansel |
| 4,231,200 A | * | 11/1980 | Henderson ............... E04H 12/34 182/19 |
| 4,712,167 A | | 12/1987 | Gordin et al. |
| 5,101,215 A | * | 3/1992 | Creaser, Jr. ........... E04H 12/182 343/883 |
| 5,314,083 A | | 5/1994 | Wiggershaus et al. |
| 6,517,225 B1 | | 2/2003 | Allen et al. |
| 6,551,226 B1 | * | 4/2003 | Webber ................... F16B 7/105 403/109.3 |
| 7,988,343 B2 | | 8/2011 | Palmisano, Jr. |
| 8,237,306 B2 | | 8/2012 | Burgess et al. |
| 8,322,687 B2 | | 12/2012 | Faccio et al. |
| 9,328,557 B2 | * | 5/2016 | Hoersch .................... E06C 5/04 |
| 2003/0137840 A1 | | 7/2003 | Citron et al. |
| 2009/0211174 A1 | | 8/2009 | Henderson et al. |
| 2010/0072158 A1 | * | 3/2010 | Wanek ..................... B66C 23/36 212/294 |
| 2014/0069088 A1 | | 3/2014 | Faccio et al. |
| 2014/0311057 A1 | * | 10/2014 | Puetz .................... E04H 12/182 52/121 |
| 2015/0023017 A1 | | 1/2015 | Smith et al. |
| 2016/0032951 A1 | * | 2/2016 | Pahwa ....................... F16B 7/14 403/377 |

* cited by examiner

*Primary Examiner* — Basil Katcheves
(74) *Attorney, Agent, or Firm* — Frank J. Dykas; Dykas Law Ofices, PLLC

(57) ABSTRACT

A safety latch telescoping mast system for a portable light tower having a towable trailer having a frame and an engine driven electrical generator and a light assembly for attachment to the uppermost end of a telescoping mast member, which includes a pivotable spring loaded safety latch assembly positioned to remain in a first, cocked, position wherein an idler roller is in rotational engagement with a hoisting cable and the latch is outside the opening in the stationary mast member when the first hoisting cable is under tension, which trips to a second, position wherein the latch passes through the opening in the stationary mast member and engages into a slot in the first telescoping mast member when the tension on the first hoisting cable is relieved.

4 Claims, 5 Drawing Sheets

TELESCOPING MAST ASSEMBLY WITH SAFETY LATCH SYSTEM

FIELD OF INVENTION

This invention generally relates to portable light towers used at construction sites having a telescoping light tower mast and a safety latch system to prevent collapse of an elevated light tower mast.

BACKGROUND OF INVENTION

Much outdoor construction activity occurs at night, particularly when it relates to highway improvements, since traffic counts are greatly reduced at night and inconvenience to the general public is minimized. A common way of illuminating a worksite is with a trailerable portable light tower. These light towers generally are assembled on small towable trailers which include an engine driven generator set operably connected to a light bar assembly which is mounted at the top of a mast which can be raised and lowered as needed. Oftentimes, the mast can be raised to an elevation of 20 to 30 feet above the trailer.

The mast must be capable of being raised and lowered. A portable trailer having a light tower mast that extends 30 feet into the air cannot be easily towed around without lowering the mast. The masts are generally not made of unitary construction since that would entail lowering the mast by pivoting it down where it would extend 30 feet back out behind the trailer. Instead, they are normally made of four or five telescoping pieces which can be lowered into a convenient stationary mast base so that the top of the trailer when the mast is fully lowered is no more than about 8 feet above ground. Such a trailer is then easily portable and can be moved about conveniently, and can even be stored or repaired indoors.

There are a number of ways of raising and lowering a mast, which include hydraulic systems, which are expensive and require additional equipment, namely a hydraulic pump and hydraulic plumbing and the supply of hydraulic fluid so as to extend the mast up and later retract it. The most common method of extending and retracting the mast is a wire cable and winch assembly.

A problem, which occurs more frequently than is desired, is that the cables used to extend and retract the mast will occasionally snap or part. When this occurs, all of the telescoping pieces come crashing down, one into the other, and if the operator happens to be standing underneath the mast at the time it comes crashing down, the operator can be seriously injured or even killed as the mast itself will typically weight 200 to 300 pounds. When they crash down, that light bar can land with a force in excess of 700 pounds which can be fatal to an unfortunate operator who happens to be standing underneath the mast at the time it comes crashing down.

Various attempts at providing some kind of safety catch for elevated light tower masts have been attempted in the past. In the case where a hydraulic system is used to raise and lower the mast, any failure of the hydraulic system, for example a burst hose, will simply result in the mast slowly dropping, and there is adequate time for anybody under the light tower mast to clear the area before the mast and its associated light tower is fully down. In the case of cable-powered elevation systems, one common practice has been to use some sort of a safety clevis pin to lock one or more pieces of the mast in place. However, this has not been a satisfactory arrangement because clevis pins are commonly misplaced and/or lost, or because the operator fails to install the clevis pin properly, or because the mast is raised to some intermediate position where the holes through which the clevis pin is to be inserted do not properly line up.

What is needed is an automatic latching system which by default is always operable to catch the mast and hold it in position in the event that the hoisting cables fail.

SUMMARY OF THE INVENTION

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

Still, other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

A trailerable light tower is formed of a trailer having a motor generator within housing and trailer tongue and stabilizing jacks. A mast assembly is provided and affixed to trailer tongue. The mast assembly is formed of one stationary member which is firmly attached to the trailer and at least a first telescoping member, and may include multiple additional telescoping members. Atop the uppermost telescoping member is operably attached a light bar assembly.

An electric hoisting cable winch is provided which may be affixed to the stationary member or some other convenient anchor point. A first hoisting cable is attached to the hoisting cable winch at one end then wound over the top of a first hoisting pulley attached to the stationary member and down in between the space between the side walls of the stationary member and the first telescoping member and attached to the first telescoping member generally near the base of the first telescoping member.

In a like manner, in the event there is a second telescoping member a second hoisting cable is also attached to the stationary member and wound over the top of a second hoisting pulley on the stationary mast member or the first telescoping member, and down to the bottom and attached generally to the base area of the second telescoping member.

In a like manner, in the event there is a third telescoping member, a third hoisting cable is fixedly attached to the top of the first telescoping member and wound over the top of a third hoisting pulley attached to the second telescoping member and attached to the base of the third telescoping member. This same hoisting cable arrangement can be repeated with additional telescoping members, if the mast is so provided with them. The top of the first telescoping member can be thought of as a stationary anchor point relative to second telescoping member which is the driving force for the hoisting cable of the third telescoping member as the first telescoping mast member is driven upwards by the first hoisting cable and winch.

A safety latch assembly is also provided and located where it is in rotational and frictional engagement with the first hoisting cable.

In the event there are multiple telescoping members then the first hoisting cable will inherently carry a strain for the entire weight of the mast assembly, and the strain can easily exceed 1,000 pounds per square inch, especially if the mast is being elevated in a windy location or when the portable light trailer is not on perfectly level ground. As a result, the first hoisting cable is by far the most likely of the cables to fail. If the first hoisting cable fails, then the first telescoping member will come crashing down into the stationary member and subsequently, all of the remaining telescoping members will also come crashing down with significant and potentially lethal force.

Accordingly, a spring loaded safety latch assembly is provided. The safety latch assembly is formed of a mounting bracket with a spring post and a spring which interconnect to a pressure plate which is affixed between a first latch bracket and a second latch bracket. Also attached to the pressure plate is a latch which is formed with an integral latch hook. The latch assembly formed of the first latch plate and the second latch plate and the pressure plate is pivotally mounted to the mounting bracket by means of a pin which forms a pivot point. An idler pulley, also rotationally mounted between the two latch plates is provided with a helical screw thread which enables the first hoisting cable to travel laterally on the idler pulley to minimize side loads on the first hoisting cable as the cable is wound onto and off of the winch.

The safety latch assembly is mounted in a position wherein as long as there is tension on the first hoisting cable, the idler pulley and latch plates force the spring into a fully compressed position. In the event that the first hoisting cable snaps and breaks, the tension force of the first hoisting cable, which is holding the idler pulley in position, is released and the spring forces the idler pulley down onto an appropriate surface, and concurrently pivoting the latch in through a slot through the side wall of the stationary member and into one of a plurality of slots that have been pre-formed in the first telescoping member thereby catching the first telescoping member before it falls to the bottom of the stationary mast member.

The spring provides enough compressive force such that it will expand out once idler pulley is released by reason of a broken first hoisting cable to engage the latch valley of the latch in one of the slots in the first telescoping member within one-tenth of one second and the mast assembly will only drop a couple of inches before all of the telescoping members come to rest in the event that first hoisting cable were to fail. This is assured by the cabling arrangement which slaves the second through the fourth telescoping members to the stationary member and the position of the first telescoping member.

It can be said that the positioning of the safety latch for engagement of the idler pulley with the first hoisting cable holds the safety latch assembly in the cocked position. It has been found in practice that oftentimes the operator when he lowers the mast to its transport position will relieve the tension on the first hoisting cable, in which case the released cable tension allows the latch to engage in a slot in the first telescoping member. However, as soon as the operator engages the winch to elevate the mast, the cable tension is restored and the safety latch assembly will be repositioned into its cocked position and clear of the slots in the first telescoping member.

In this manner, safety latching mechanism is provided for the mast which is automatic in operation, and requires no operator intervention, and does not require any pins or manual latches to be engaged. It will work at all heights, and it does not require that the mast be elevated to certain selected heights where holes for a safety pin or clevis pin are aligned to allow insertion of the safety or clevis pin.

DETAILED DESCRIPTION OF THE PREFERRED EMBODIMENTS

Figure 1:
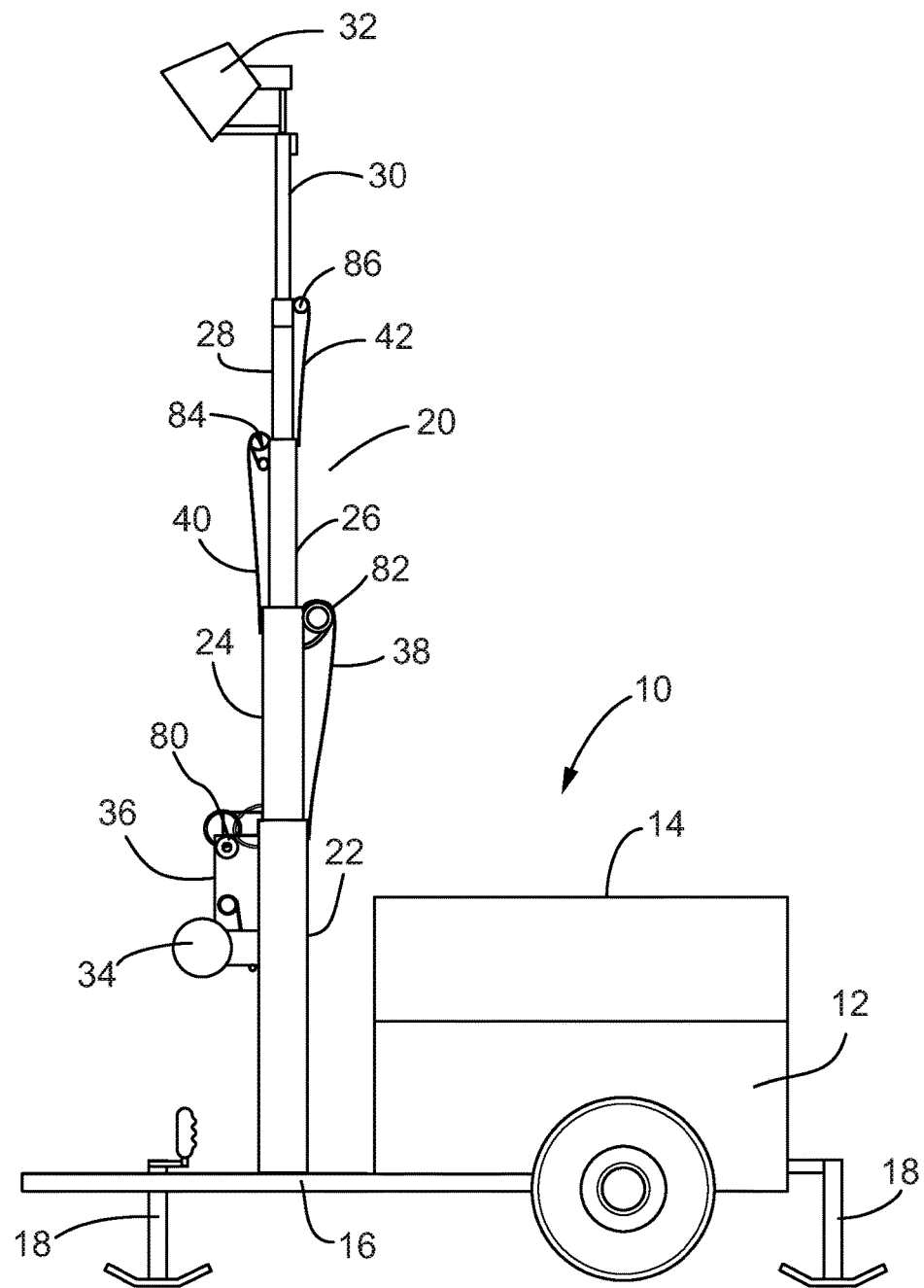
FIG. 1 is a simplified side view of a portable light tower having an automatic safety latch assembly for the mast tower.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 shows a simplified side view of the portable light tower with the safety latch mechanism installed. Towable light tower 10 is formed of trailer 12 having an engine driven generator set (not shown) within housing 14 and trailer tongue 16 or otherwise affixed to the trailer, and stabilizing jacks 18. Mast assembly 20 is provided and affixed to trailer tongue 16. The mast assembly 20 is formed of stationary member 22 which is firmly attached to trailer tongue 16 and first telescoping assembly 24, second telescoping assembly 26, third telescoping assembly 28, and fourth telescoping assembly 30. Atop the fourth telescoping assembly 30 is attached a light bar assembly 32. Not shown is the appropriate electrical wiring and associated cabling which play no part in the present invention.

An electric hoisting cable winch 34 is provided and affixed to the stationary member 22 which is attached to a first hoisting cable 36.

Figure 4:
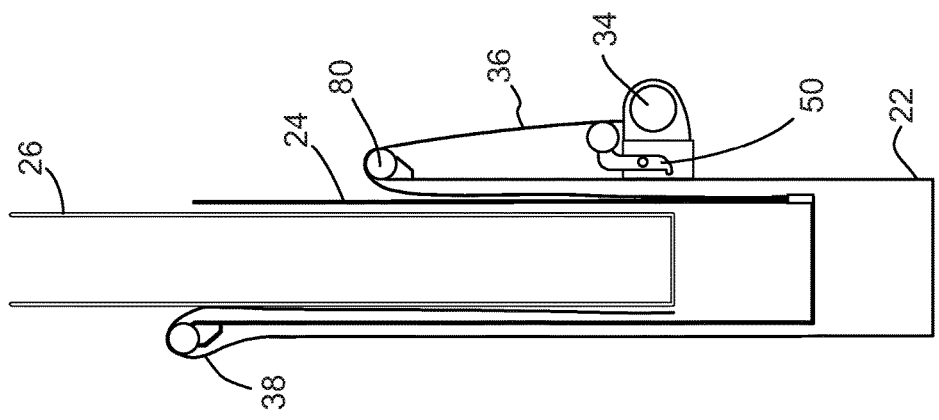
FIG. 4 is a cut-away representation of the stationary mast member and first and second telescoping members in a partially elevated position.
Figure 3:
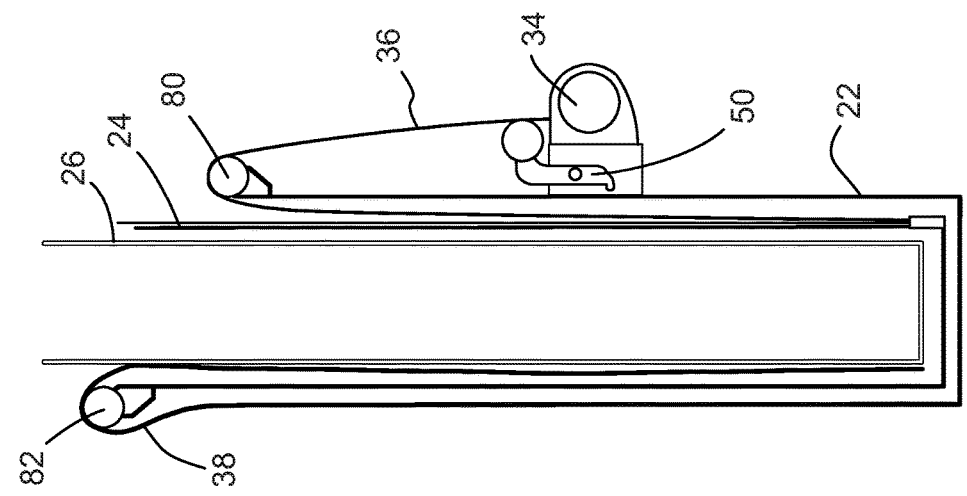
FIG. 3 is a cut-away representation of the stationary mast member and first and second telescoping members in a retracted position.

Now referring to FIGS. 1, 3 and 4, the hoisting cabling system is shown and described. There is a first hoisting cable 36, which is attached to hoisting cable winch 34 at one end then wound over the top of first hoisting pulley 80 and down in between the space between the side walls of stationary member 22 and first telescoping member 24 and attached to first telescoping member 24 generally near the base of first telescoping member 24.

In a like manner, as is shown in FIG. 3, second hoisting cable 38 is also attached stationary member 22 and wound over the top of second hoisting pulley 82 and down to the bottom and attached generally to the base area of second telescoping member 26.

In a like manner, as shown in FIG. 1, the third hoisting cable 40 is fixedly attached to the top of first telescoping member 24 and wound over the top of third hoisting pulley 84 and attached to the base of third telescoping member 28 and fourth hoisting cable 42 is attached to second telescoping member 26 and wound over the top of fourth hoisting pulley 86 and attached to the base of fourth telescoping member 30. For clarity, FIGS. 3 and 4 only show the stationary mast member 22 and first and second telescoping members 24 and 26. But it should be apparent to those skilled in the art that exactly the same configuration is used for the third and fourth telescoping members 28 and 30 using different hoisting cable anchor points. Hoisting cable winch 34 is provided rigidly affixed to stationary member 22. In the preferred embodiment, stationary member 22 and all of the telescoping members, 24 through 30, are approximately five feet in length so that when the mast is fully extended, the light bar is positioned approximately 25 feet above the tongue of the portable trailer.

Safety latch assembly 50 is also provided and rotational and frictional engagement with first hoisting cable 36. In the preferred embodiment, hoisting cable winch 34 is electrically operable from a switch location where the operator must stand clear of the mast when it is being elevated or lowered. Third and fourth telescoping members 28 and 30 are also pulled out as a result of the first telescoping member 24 being extracted out of the stationary member 22. It can be said that the cabling arrangement is slaved to the first hoisting cable 36 because each of the subsequent hoisting cables are attached to an earlier telescoping member which is being forced up and out of its nested position to the elevated position.

Each of the four separate hoisting cables, 36 through 42, is lifting a progressively lighter load. The first hoisting cable 36 carries a strain for the entire weight of the mast assembly, and the strain can easily exceed 1,000 pounds per square inch, especially if the mast is being elevated in a windy location or when the linked portable light trailer is not on perfectly level ground. As a result, the first hoisting cable 36 is by far the most likely of the cables to fail. In fact, in practice it has been found that first hoisting cable 36 can easily fail in as little as 150 to 200 cycles of elevating the mast up and lowering it down. If the first hoisting cable 36 fails, then the first telescoping member comes crashing down into the stationary member and subsequently, all of the remaining telescoping members come crashing down with significant and potentially lethal force.

Figure 5:
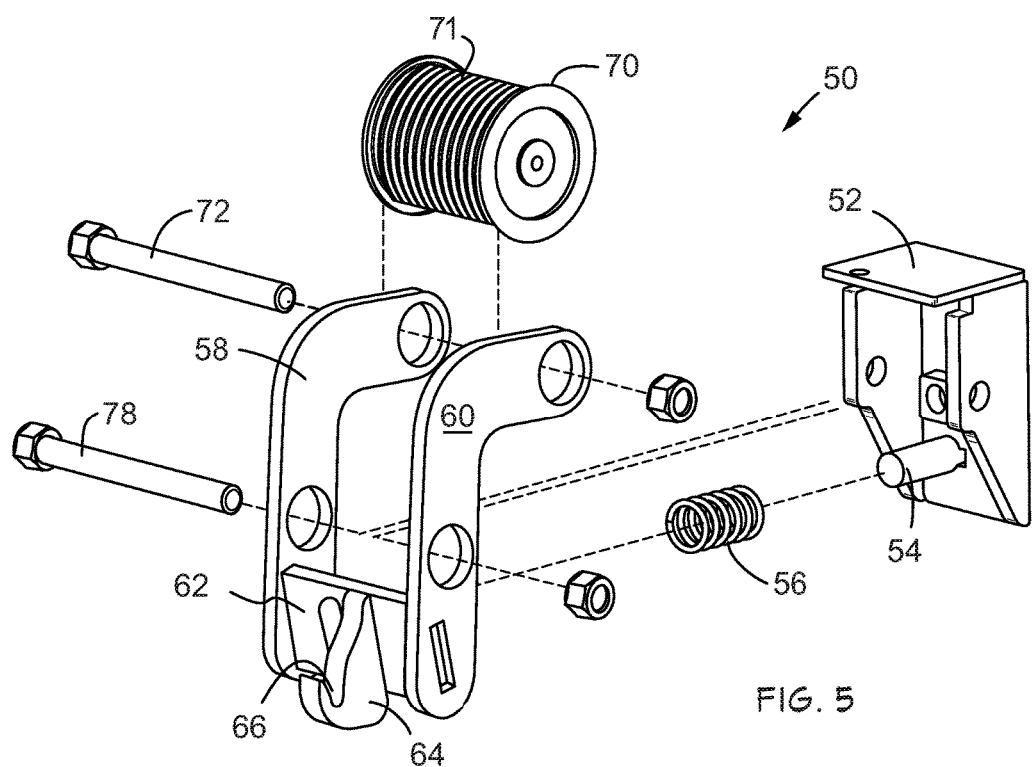
FIG. 5 is an exploded view of the safety latch assembly.
Figure 6:
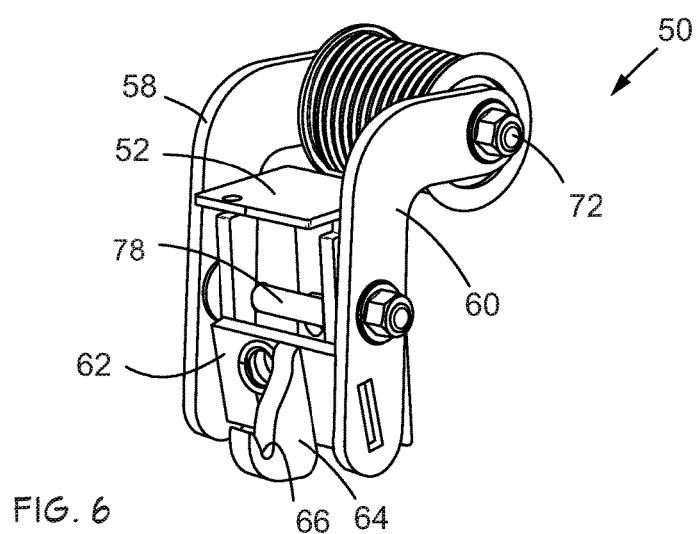
FIG. 6 is a perspective view of the safety latch assembly.
Figure 7:
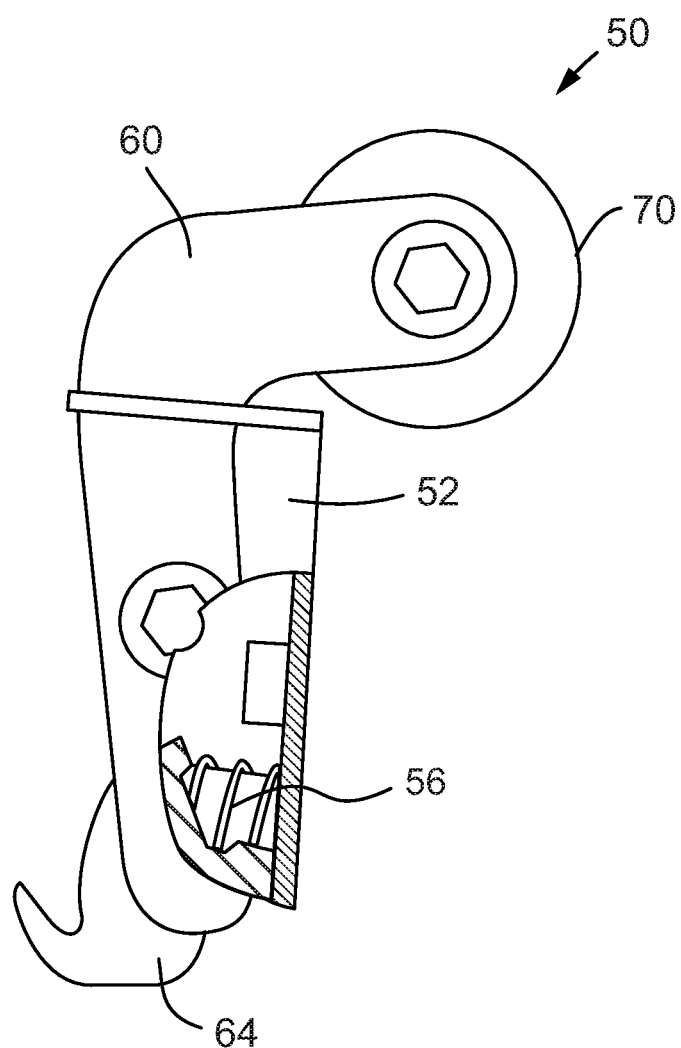
FIG. 7 is a sectional view of the safety latch mechanism taken along the plane A-A of FIG. 6.

Accordingly, safety latch assembly 50 is provided. Referring now to FIGS. 5, 6 and 7, there is shown and described the safety latch assembly 50. Mounting bracket 52 is provided with spring post 54 and spring 56 which interconnect to pressure plate 62 which is affixed between first latch bracket 58 and second latch bracket 60. Also attached to pressure plate 62 is latch 64 which is formed with integral latch hook 66. The latch assembly formed of first latch plate 58 and second latch plate 60 and pressure plate 62 is pivotally mounted to mounting bracket 52 by means of pin 78 which forms a pivot point. Idler pulley 70, which is attached to safety latch assembly 50 by means of shaft, is provided with a helical screw thread 71 which enables the first hoisting cable 36 to travel laterally on idler pulley 70 to minimize side loads on the first hoisting cable 36 as the cable is wound onto and off of winch 34.

Figure 2:
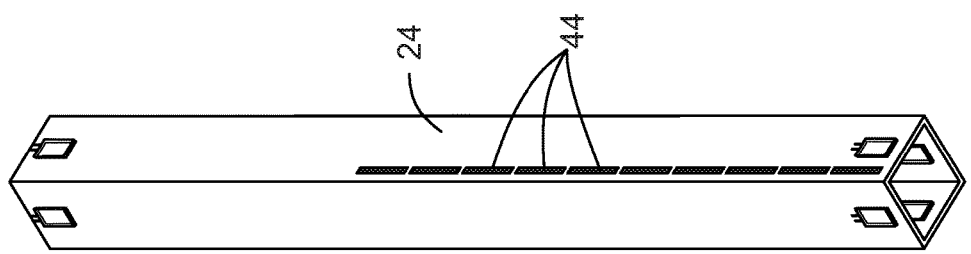
FIG. 2 is a perspective representational view of the first telescoping member.
Figure 9:
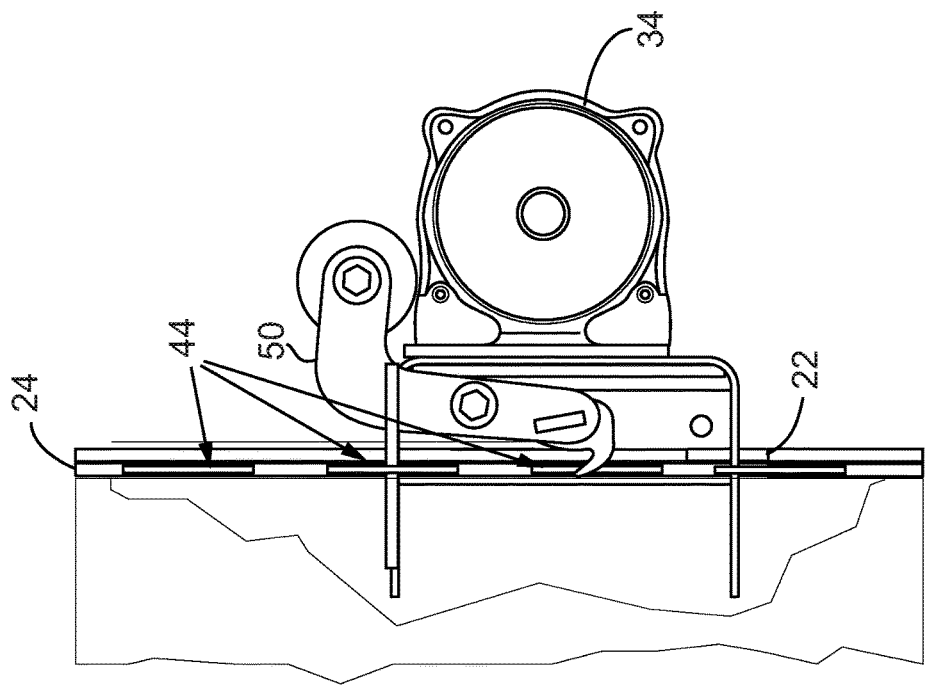
FIG. 9 is a representational sectional side view of the safety latch assembly in the tripped position.
Figure 8:
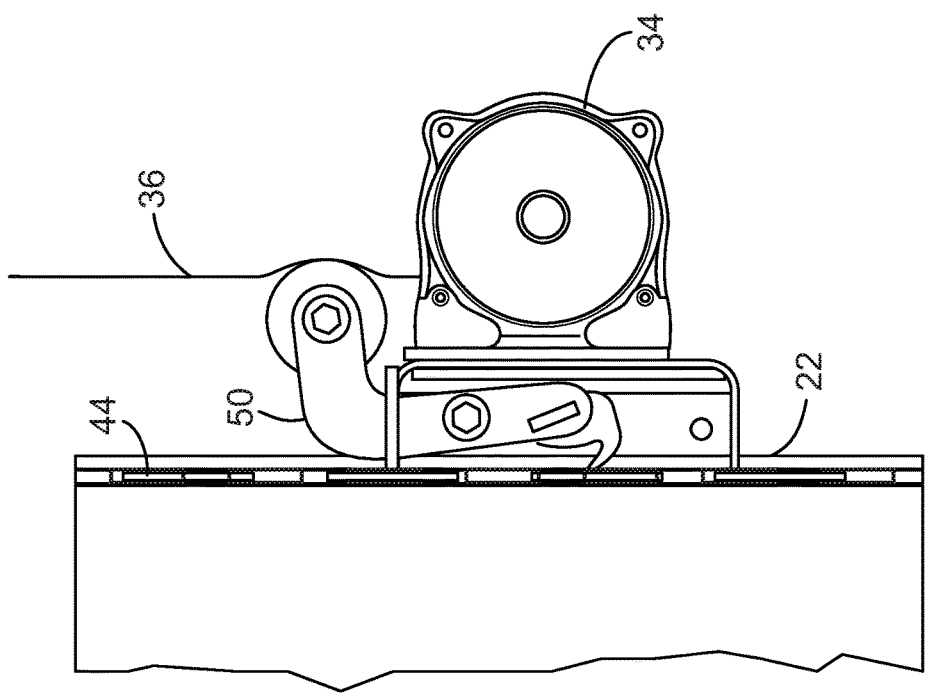
FIG. 8 is a representational sectional side view of the safety latch assembly in the cocked position.

The safety latch assembly 50 is mounted in a position wherein as long as there is tension on first hoisting cable 36, the idler pulley 70 forces spring 56 into a fully compressed position. This is shown in FIG. 8. In the event that first hoisting cable 36 snaps and breaks, the tension force which is holding idler pulley 70 in position is released and spring 56 forces the idler pulley 70 down onto an appropriate surface, and concurrently, latch 64 is pivoted in through a slot through the side wall of stationary member 22 and into one of the plurality of slots 44 that have been formed in the first telescoping member 24, as shown in FIGS. 2 and 9.

Spring 56 provides enough compressive force such that it will expand out once idler pulley 70 is released by reason of a broken first hoisting cable 36 to engage latch valley 66 of latch 64 in one of the slots 44 within one-tenth of one second and the mast assembly 20 will only drop a couple of inches before all of the telescoping members come to rest in the event that first hoisting cable 36 were to fail. This is assured by the cabling arrangement which slaves the second through the fourth telescoping members to the stationary member and the position of the first telescoping member.

The arrangement of safety latch 50 and its engagement with first hoisting cable 36 holds the safety latch assembly in the cocked position. It has been found in practice that oftentimes the operator when he lowers the mast to its transport position will relieve the tension on first hoisting cable 36, in which case, latch 64 will engage in a slot 44 in the first telescoping member 24. However, as soon as the operator engages the winch to elevate the mast 20, the tension is restored and the safety latch assembly 50 will be repositioned into its cocked position and clear of slots 44 and first telescoping member 24.

In this manner, safety latching mechanism is provided for the mast which is automatic in operation, it requires no operator intervention, and does not require any pins or manual latches to be engaged. It will work at all heights, and it does not require that the mast be elevated to certain selected heights where holes for a safety pin or clevis pin are aligned to allow insertion of the safety or clevis pin.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The invention claimed is:

1. A safety latch system for a telescoping mast for a portable light tower having a towable trailer having a frame, an engine driven electrical generator, and a light assembly for attachment to the uppermost end of a telescoping mast member, which comprises:

a stationary mast member of predetermined length having an upper end, and a first side, vertically oriented and attached to the frame, the stationary mast member defining a interior first cavity slideably receiving a first hoisting cable and a first telescoping mast member, the stationary mast member having an opening therethrough in the first side;

the first telescoping mast member having a longitudinal length and base sized and configured to be slideably received within the first cavity of the stationary mast member for telescoping into and out of said cavity without rotating relative to the stationary mast member, the first telescoping mast member having a plurality of slots formed therein along its longitudinal length configured for alignment with the opening in the first side of the stationary mast member as the first telescoping mast member is telescoped into and out of the stationary mast member;

a winch assembly fixed to the towable trailer;

a first hoisting pulley attached to the upper end of the stationary mast member;

a first hoisting cable operably attached at one end to the winch assembly, and configured to pass in front of the opening in the first side of the stationary mast member, and wound over the top of the hoisting pulley and threaded down within the first cavity between the cavity wall and an outside wall of the first telescoping mast member and attached, at the hoisting cable's second end, to the first telescoping member near its base; and a pivotable spring loaded safety latch assembly, having a latch at one end, and an idler roller at the other, attached to the stationary mast member and positioned between the first hoisting cable and the opening in the first side of the stationary mast member, and pivotable from a first, cocked, position wherein the idler roller is in rotational engagement with the first hoisting cable and the latch is outside the opening in the stationary mast member when the first hoisting cable is under tension, to a second, tripped, position wherein the latch passes through the opening in the stationary mast member and engages into a slot in the first telescoping mast member when the tension on the first hoisting cable is relieved.

2. A safety latch system for a telescoping mast for a portable light tower of claim 1 which further comprises:

the first cavity within the stationary mast member is configured in a generally rectangular cross sectional shape; and the cross sectional shape of the outer surface of the telescoping mast member is of conforming generally rectangular shape and size as the cross sectional shape of the first cavity so as to prevent rotation of the first telescoping mast member within said cavity.

3. A safety latch system for a telescoping mast for a portable light tower of claim 1 which further comprises:

the first telescoping mast member defining a second cavity for receiving, in telescoping relationship, a second telescoping mast member;

a second telescoping mast member sized and configured to be slideably and telescopically received the second cavity within the first telescoping mast member;

a second hoisting pulley attached to either the upper end of the stationary member or the first telescoping member; and a second hoisting cable attached at one end to the upper end of the stationary mast member, and wound over the top of the second hoisting pulley and threaded down within the second cavity between the second cavity wall and an outside wall of the second telescoping mast member and attached, at its second end to the second telescoping mast member near the base of the second telescoping mast member.

4. A safety latch system for a telescoping mast for a portable light tower of claim 3 which further comprises:

the second telescoping mast member defining a third cavity for receiving, in telescoping relationship, a third telescoping mast member;

a third telescoping mast member sized and configured to be slideably and telescopically received the third cavity within the second telescoping mast member;

a third hoisting pulley attached to the upper end of the second telescoping mast member; and a third hoisting cable attached at one end to the upper end of the first telescoping mast member, and wound over the top of the third hoisting pulley and threaded down within the third cavity between the third cavity wall and an outside wall of the third telescoping mast member and attached, at its second end to the third telescoping mast member near the base of the third telescoping mast member.

\* \* \* \* \*